United States Patent Office 3,082,212
Patented Mar. 19, 1963

---

3,082,212
SULPHONAMIDES OF 5H-PYRROLO[3,4-b]-PYRIDINES
Wilfried Graf, Binningen, near Basel, and Erich Schmid, Basel, Switzerland, assignors to Geigy Chemical Corporation, Ardsley, N.Y., a corporation of Delaware
No Drawing. Filed July 28, 1961, Ser. No. 127,508
Claims priority, application Switzerland July 29, 1960
5 Claims. (Cl. 260—294.8)

The present invention concerns new sulphonamides having valuable pharmacological properties.

It has now surprisingly been found that sulphonamides of the general formula

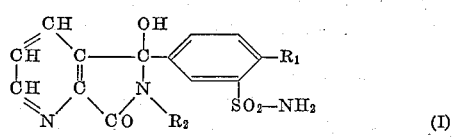

(I)

wherein $R_1$ represents a chlorine or bromine atom, and
$R_2$ represents hydrogen or a methyl radical, which compounds can be termed 4'-substituted 7-oxo-5-(3' - sulphamylphenyl) - 5 - hydroxy - 6,7 - dihydro - 5H - pyrrolo[3,4-b]pyridines, have an excellent diuretic and saluretic activity. In this connection, the ratio of ions eliminated is very favourable as the amount of potassium ions eliminated is very slight in comparison to the amount of sodium ions, and, the amount of sodium ions eliminated is, in its turn, approximately equal to that of chlorine ions. The elimination of these ions means that there is also a great elimination of water.

The compounds according to the invention, therefore, can be used as diuretics and saluretics. They are administered to adults in daily doses of, for example, 50–200 mg. per os, with which dosage a diuresis of long duration is attained. They can be administered, for example, in the form of tablets which are produced in the usual way and which can contain as additives, e.g. highly dispersed silicium dioxide, potato starch, lactose, gelatines, glycerin, talcum and magnesium stearate.

To produce the compounds defined above, a compound of the general formula

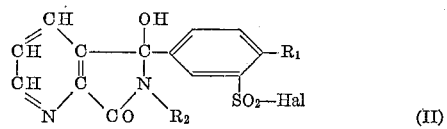

(II)

wherein Hal represents chlorine or bromine and $R_1$ and $R_2$ have the meanings given above, is reacted with ammonia; or a compound of the general formula

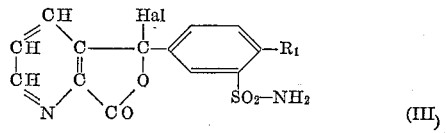

(III)

is reacted, preferably in the presence of acid binding agents, e.g. excess ammonia or amine, with ammonia or with a primary amine corresponding to the general formula $$R_2-NH_2 \quad (IV)$$

wherein $R_1$, $R_2$ and Hal have the meanings given above.

A particular method of performing the two processes given above for the production of compounds of the general formula I in which $R_2$ is hydrogen, consists in reacting a compound of the general formula

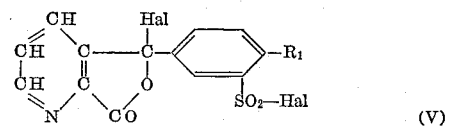

(V)

wherein $R_1$ and Hal have the meanings given above, with ammonia.

Starting materials of the general Formulae II, III and V can be obtained, for example, starting from halogen benzenes and quinolinic acid anhydride. By condensing such reaction components according to Friedel-Crafts, 3-(4'-chlorobenzoyl)- and 3-(4'-bromobenzoyl)-pyridine-2-carboxylic acids are obtained. 4'-substituted-3-benzoyl-pyridine-2-carboxylic acids are also obtained by reacting 4-substituted phenyl magnesium halides with quinolinic acid anhydride.

Such 4'-substituted 3-benzoyl pyridine-2-carboxylic acids are nitrated in the 3'-position. 4'-substituted 3-(3' - halogen - sulphonyl - benzoyl) - pyridine - 2 - carboxylic acids are obtained by reducing the 4'-substituted 3-(3'-nitrobenzoyl)-pyridine-2-carboxylic acids formed, diazotising the 3'-amino compounds obtained and decomposing the diazonium halides with sulphur dioxide in the presence of copper salts such as cupric chloride or cupric bromide. These 4'-substituted 3-(3'-halogen-sulphonylbenzoyl) - pyridine-2-carboxylic acids are reacted, for example, with ammonia to form 4'-substituted 3 - (3' - sulphamyl - benzoyl)-pyridine-2-carboxylic acids which can be converted in their turn into halogen lactones as starting materials of the general Formula III by treatment with mineral acid halides, e.g. thionyl chloride, phosphorus oxychloride, phosphorus pentachloride or phosphorus tribromide.

However, the halogen sulphonyl compounds mentioned above can also be converted into starting materials of the general Formula V by treatment with mineral acid halides.

Starting materials of the general Formula II are obtained, e.g. by first converting the Friedel-Crafts condensation products or Grignard condensation products mentioned above by treatment with mineral acid halides into halogen lactones which correspond to the general Formula III except for the missing sulphamyl group, reacting these halogen lactones with ammonia or amines of the general Formula IV and introducing the halogen sulphonyl radical into the reaction products, for example, as mentioned above by nitration, reduction, diazotisation and decomposition with sulphur dioxide.

The above summary by no means exhausts the possibilities for the production of suitable starting materials of the general Formulae II, III and V by known methods.

Starting materials of the general Formula IV are, e.g. ammonia and methylamine.

The following example illustrates the production of the new isoindoline derivatives. Parts are given therein as parts by weight and their relationship to parts by volume is as that of grammes to cubic centimetres. The temperatures are in degrees centigrade.

*Example*

(a) 100 parts of finely pulverised quinolinic acid anhydride are added to 600 parts of chlorobenzene, 182 parts of aluminum chloride are then added while stirring whereupon the mixture is heated to 95° and stirred for 4 hours at this temperature. The dark precipitate formed is carefully treated with ice and hydrochloric acid, the precipitate obtained is filtered off under suction, dissolved in dilute lye and again precipitated with hydrochloric acid. It is then crystallised from ethanol and the 3-(4'-chlorobenzoyl)-α-picolinic acid is obtained as pale yellow crystals which melt at 157.5–158.5° (on decomposition).

(b) 26 parts of 3-(4'-chlorobenzoyl)-α-picolinic acid are dissolved in 400 parts of sulphuric acid monohydrate. 15 parts of nitrating acid (50% content of $HNO_3$) are added dropwise at 5° whereupon the temperature of the mixture is allowed to slowly rise to ambient while stirring. The mixture is then poured onto a large amount of ice and the excess mineral acids are neutralised with sodium carbonate whereupon the yellow crude product crystallises out. This is filtered off under suction, washed with water and recrystallised from alcohol. The 3-(4'-chloro-3'-nitrobenzoyl)-α-picolinic acid is obtained as pale yellow crystals which melt at 160–160.5° on decomposition.

(c) 54 parts of 3-(4'-chloro-3'-nitrobenzoyl)-α-picolinic acid in the form of the solution of the sodium salt in 400 parts of water are added dropwise within 2 hours at boiling temperature to a boiling mixture of 90 parts of ground cast iron filings in 350 parts of water and 42 parts of concentrated hydrochloric acid and the whole is stirred for another 1½ hours at this temperature. The reaction mixture is then cooled and made phenolphthalein alkaline with 30% caustic soda lye. The mixture is then filtered under suction and the residue is washed with boiling alcohol. The combined filtrates are concentrated to about 100 parts by volume and made weakly acid with concentrated hydrochloric acid. The precipitated crude product is filtered off under suction, washed, dried and recrystallised from alcohol whereupon 3-(4'-chloro-3'-aminobenzoyl)-α-picolinic acid is obtained which melts at 177–178° (on decomposition).

(d) 18.5 parts of 3-(4'-chloro-3'-aminobenzoyl)-α-picolinic acid are suspended in 120 parts of glacial acetic acid and 10 parts of water, dissolved by the addition of 27 parts of concentrated hydrochloric acid and cooled to 10°. 12.5 parts of 40% sodium nitrite solution are added dropwise at 10–15°. 10 minutes after the dropwise addition has been completed, the clear diazo solution is poured into a suspension prepared by mixing 100 parts of 30% solution of sulphur dioxide in glacial acetic acid and a solution of 2 parts of copper-II-chloride hydrate in 2 parts of water, whereupon the exothermic reaction occurs with foaming. As soon as no more diazo compound can be traced, cold water is added to the dark green solution and the green suspension obtained is filtered under suction whereupon the crude 3-(4'-chloro-3'-chlorosulphonylbenzoyl)-α-picolinic acid obtained on the filter is dried as much as possible under suction.

(e) 22 parts of the crude 3-(4'-chloro-3'-chlorosulphonylbenzoyl)-α-picolinic acid are suspended in 200 parts of thionyl chloride whereupon hydrogen chloride is developed. The mixture is refluxed for 1 hour, then excess thionyl chloride is evaporated off in vacuo and the dark green residue is added under ice cooling to a mixture of 64 parts of ammonia and 24 parts of ethanol. To remove copper ions remaining from the previous step, an excess of ammonium sulphide is added to the solution, the precipitated copper sulphide is filtered off under suction and the filtrate is concentrated. The crystals which form after some time are recrystallised from 50% aqueous alcohol whereupon the 7-oxo-5-(3'-sulphamyl-4'-chlorophenyl)-5-hydroxy-6,7-dihydro-5H-pyrrolo[3,4-b]pyridine is obtained as a white crystalline product which melts at 236–237° (on decomposition), but this rather dependent on the type of heating used.

7-oxo-6-methyl-5-(3'-sulphamyl-4'-chlorophenyl)-5-hydroxy-6,7-dihydro-5H-pyrrolo[3,4-b]pyridine, 7-oxo-6-methyl-5-(3'-sulphamyl-4'-bromophenyl)-5-hydroxy-6,7-dihydro-5H-pyrrolo[3,4-b]pyridine and 7-oxo-5-(3'-sulphamyl-4'-bromophenyl)-5-hydroxy-6,7-dihydro-5H-pyrrolo[3,4-b]-pyridine are produced in an analogous manner.

What we claim is:

1. A compound of the formula

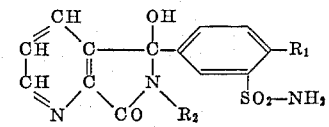

wherein $R_1$ is a member selected from the group consisting of bromine and chlorine, and $R_2$ is a member selected from the group consisting of hydrogen and methyl.

2. 7-oxo-5-(3'-sulphamyl-4'-chlorophenyl)-5-hydroxy-6,7-dihydro-5H-pyrrolo[3,4-b]pyridine.

3. 7-oxo-6-methyl-5-(3'-sulphamyl-4'-chlorophenyl)-5-hydroxy-6,7-dihydro-5H-pyrrolo[3,4-b]pyridine.

4. 7-oxo-5-(3'-sulphamyl-4'-bromophenyl)-5-hydroxy-6,7-dihydro-5H-pyrrolo[3,4-b] pyridine.

5. 7-oxo-6-methyl-5-(3'-sulphamyl-4'-bromophenyl)-5-hydroxy-6,7-dihydro-5H-pyrrolo[3,4-b]pyridine.

No references cited.